(12) United States Patent
Hall

(10) Patent No.: US 8,712,056 B2
(45) Date of Patent: Apr. 29, 2014

(54) SECURE MOBILE AD HOC NETWORK

(75) Inventor: Robert Hall, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 294 days.

(21) Appl. No.: 12/793,460

(22) Filed: Jun. 3, 2010

(65) Prior Publication Data

US 2011/0299685 A1 Dec. 8, 2011

(51) Int. Cl.
*H04L 9/00* (2006.01)
(52) U.S. Cl.
USPC ............ 380/273; 380/44; 380/281; 713/162; 713/163
(58) Field of Classification Search
None
See application file for complete search history.

(56) References Cited

U.S. PATENT DOCUMENTS

| | | | |
|---|---|---|---|
| 6,015,344 A | 1/2000 | Kelly et al. | |
| 6,119,976 A | 9/2000 | Rogers | |
| 6,195,751 B1 * | 2/2001 | Caronni et al. | ............... 713/163 |
| 6,304,556 B1 | 10/2001 | Haas | |
| 6,628,620 B1 | 9/2003 | Cain | |
| 6,781,971 B1 | 8/2004 | Davis et al. | |
| 6,807,165 B2 | 10/2004 | Belcea | |
| 6,816,460 B1 | 11/2004 | Ahmed et al. | |
| 6,870,846 B2 | 3/2005 | Cain | |
| 6,879,574 B2 | 4/2005 | Naghian et al. | |
| 6,909,706 B2 | 6/2005 | Wilmer et al. | |
| 6,937,602 B2 | 8/2005 | Whitehill et al. | |
| 6,940,832 B2 | 9/2005 | Saadawi et al. | |
| 6,954,435 B2 | 10/2005 | Billhartz et al. | |
| 6,958,986 B2 | 10/2005 | Cain | |
| 7,027,822 B1 | 4/2006 | Hwang et al. | |
| 7,152,110 B2 | 12/2006 | Pierce | |
| 7,179,166 B1 | 2/2007 | Abbott | |
| 7,197,326 B2 | 3/2007 | Acampora | |
| 7,295,521 B2 | 11/2007 | Choi et al. | |
| 7,307,978 B2 | 12/2007 | Carlson | |
| 7,525,933 B1 | 4/2009 | Hall | |
| 7,573,858 B2 | 8/2009 | Roh et al. | |
| 7,613,467 B2 * | 11/2009 | Fleischman | ................ 455/456.1 |
| 7,813,326 B1 | 10/2010 | Kelm et al. | |
| 7,864,168 B2 | 1/2011 | French | |
| 7,917,169 B1 | 3/2011 | Hall | |
| 7,957,390 B2 | 6/2011 | Furlong et al. | |
| 7,969,914 B1 | 6/2011 | Gerber | |
| 7,970,749 B2 | 6/2011 | Uhlir et al. | |
| 8,001,189 B2 | 8/2011 | Nielsen et al. | |

(Continued)

FOREIGN PATENT DOCUMENTS

WO   WO 2007/016641 A2   2/2007

OTHER PUBLICATIONS

U.S. Appl. No. 13/327,472, filed Dec. 15, 2011, Hall.
U.S. Appl. No. 13/333,084, filed Dec. 21, 2011, Hall.

(Continued)

*Primary Examiner* — Jeffrey Pwu
*Assistant Examiner* — Helai Salehi
(74) *Attorney, Agent, or Firm* — Baker & Hostetler LLP

(57) ABSTRACT

Security in a mobile ad hoc network is maintained by using various forms of encryption, various encryption schemes, and various multi-phase keying techniques. In one configuration, an over the air, three-phase, re-keying technique is utilized to ensure that no authorized nodes are lost during re-keying and that nodes that are intended to be excluded from re-keying are excluded. In another configuration, an over the air, two-phase keying technique, is utilized to maintain backwards secrecy.

19 Claims, 11 Drawing Sheets

(56) References Cited

U.S. PATENT DOCUMENTS

| | | | |
|---|---|---|---|
| 8,074,275 | B2 | 12/2011 | Ramaiah et al. |
| 8,085,813 | B2 | 12/2011 | Melick et al. |
| 8,128,405 | B2 | 3/2012 | Preston et al. |
| 8,248,367 | B1 | 8/2012 | Barney et al. |
| 8,332,544 | B1 | 12/2012 | Ralls et al. |
| 8,341,271 | B2 | 12/2012 | Cho et al. |
| 8,359,643 | B2 | 1/2013 | Low et al. |
| 8,376,857 | B1 | 2/2013 | Shuman et al. |
| 2002/0141454 | A1 | 10/2002 | Muniere |
| 2002/0155846 | A1 | 10/2002 | Shiraga |
| 2002/0163912 | A1 | 11/2002 | Carlson |
| 2002/0167960 | A1 | 11/2002 | Garcia-Luna-Aceves |
| 2003/0193394 | A1 | 10/2003 | Lamb |
| 2003/0235158 | A1 | 12/2003 | Lee |
| 2004/0185881 | A1 | 9/2004 | Lee et al. |
| 2004/0213270 | A1 | 10/2004 | Su et al. |
| 2005/0058151 | A1 | 3/2005 | Yeh |
| 2005/0096065 | A1 | 5/2005 | Fleischman |
| 2005/0152318 | A1 | 7/2005 | Elbatt et al. |
| 2005/0152378 | A1 | 7/2005 | Bango et al. |
| 2005/0254453 | A1 | 11/2005 | Barneah |
| 2005/0259597 | A1 | 11/2005 | Benedetto |
| 2006/0013154 | A1 | 1/2006 | Choi et al. |
| 2006/0023677 | A1 | 2/2006 | Labrador |
| 2006/0084444 | A1 | 4/2006 | Kossi et al. |
| 2006/0126535 | A1 | 6/2006 | Sherman |
| 2006/0128349 | A1 | 6/2006 | Yoon |
| 2006/0148516 | A1 | 7/2006 | Reddy et al. |
| 2006/0153157 | A1 | 7/2006 | Roh et al. |
| 2007/0008925 | A1 | 1/2007 | Dravida et al. |
| 2007/0019594 | A1 | 1/2007 | Perumal et al. |
| 2007/0110092 | A1 | 5/2007 | Kangude et al. |
| 2007/0198731 | A1 | 8/2007 | Li et al. |
| 2007/0217346 | A1 | 9/2007 | Zheng |
| 2007/0259716 | A1 | 11/2007 | Mattice et al. |
| 2007/0259717 | A1 | 11/2007 | Mattice et al. |
| 2007/0265088 | A1 | 11/2007 | Nakada et al. |
| 2007/0265089 | A1 | 11/2007 | Robarts et al. |
| 2007/0266396 | A1 | 11/2007 | Estermann |
| 2007/0287437 | A1 | 12/2007 | Cartmell |
| 2008/0015024 | A1 | 1/2008 | Mullen |
| 2008/0039113 | A1 | 2/2008 | Liu et al. |
| 2008/0058099 | A1 | 3/2008 | Schwartz et al. |
| 2008/0080401 | A1 | 4/2008 | Ribiere |
| 2008/0144493 | A1 | 6/2008 | Yeh |
| 2008/0159236 | A1 | 7/2008 | Ch'ng |
| 2008/0163355 | A1 | 7/2008 | Chu |
| 2008/0186206 | A1 | 8/2008 | Reumerman |
| 2008/0192737 | A1 | 8/2008 | Miyazaki |
| 2008/0262928 | A1 | 10/2008 | Michaelis |
| 2009/0017913 | A1 | 1/2009 | Bell et al. |
| 2009/0030605 | A1 | 1/2009 | Breed |
| 2009/0041039 | A1 | 2/2009 | Bear |
| 2009/0045977 | A1 | 2/2009 | Bai et al. |
| 2009/0046628 | A1 | 2/2009 | Hall |
| 2009/0138353 | A1 | 5/2009 | Mendelson |
| 2009/0175223 | A1 | 7/2009 | Hall |
| 2009/0201860 | A1 | 8/2009 | Sherman et al. |
| 2009/0207783 | A1 | 8/2009 | Choi et al. |
| 2009/0245518 | A1* | 10/2009 | Bae et al. .................... 380/273 |
| 2009/0248420 | A1 | 10/2009 | Basir |
| 2009/0298461 | A1 | 12/2009 | O'Reilly |
| 2009/0323579 | A1 | 12/2009 | Bai et al. |
| 2009/0325603 | A1 | 12/2009 | Van Os et al. |
| 2010/0008259 | A1 | 1/2010 | Yoon et al. |
| 2010/0060480 | A1 | 3/2010 | Bai et al. |
| 2010/0067451 | A1 | 3/2010 | Hall |
| 2010/0074234 | A1 | 3/2010 | Banks et al. |
| 2010/0082513 | A1 | 4/2010 | Liu |
| 2010/0162149 | A1 | 6/2010 | Sheleheda et al. |
| 2010/0169009 | A1 | 7/2010 | Breed et al. |
| 2010/0214987 | A1 | 8/2010 | Mori |
| 2010/0226342 | A1 | 9/2010 | Colling et al. |
| 2010/0245124 | A1 | 9/2010 | Bai et al. |
| 2010/0248618 | A1 | 9/2010 | Bai et al. |
| 2010/0248843 | A1 | 9/2010 | Karsten |
| 2010/0250106 | A1 | 9/2010 | Bai et al. |
| 2010/0250346 | A1 | 9/2010 | Bai et al. |
| 2010/0279776 | A1 | 11/2010 | Hall |
| 2010/0287011 | A1 | 11/2010 | Muchkaev |
| 2010/0304759 | A1 | 12/2010 | Leppanen et al. |
| 2010/0329463 | A1* | 12/2010 | Ratliff et al. .................. 380/279 |
| 2011/0081973 | A1 | 4/2011 | Hall |
| 2011/0102459 | A1 | 5/2011 | Hall |
| 2011/0103302 | A1 | 5/2011 | Hall |
| 2011/0105151 | A1 | 5/2011 | Hall |
| 2011/0177829 | A1 | 7/2011 | Platt et al. |
| 2011/0230202 | A1 | 9/2011 | Wood et al. |
| 2012/0058814 | A1 | 3/2012 | Lutnick et al. |
| 2012/0079080 | A1 | 3/2012 | Pishevar |
| 2012/0094770 | A1 | 4/2012 | Hall |

OTHER PUBLICATIONS

U.S. Appl. No. 12/837,168, filed Jul. 15, 2010, Hall.
U.S. Appl. No. 12/914,886, filed Oct. 28, 2010, Hall.
U.S. Appl. No. 11/264,834, filed Nov. 1, 2005, Hall.
U.S. Appl. No. 12/969,386, filed Dec. 15, 2010, Hall.
U.S. Appl. No. 13/169,892, filed Jun. 27, 2011, Hall.
U.S. Appl. No. 13/169,829, filed Jun. 27, 2011, Hall.
U.S. Appl. No. 13/277,895, filed Oct. 20, 2011, Hall.
Ko et al., "Geocasting in Mobile Ad Hoc Networks: Location-based Multicast Algorithms", Technical Report TR-98-018 Texas A&M University, Sep. 1998.
Ko, et al., "Flooding-Based Geocasting Protocols for Mobile Ad Hoc Networks," Mobile Networks And Applications, Dec. 2002, 7, 471-480.
Hall et al., "A Two-Level Quality of Service Scheme for Collision based on Mobile Ad Hoc Networks", IEEE, 1-4244-1513-06/07, 2007, 8 pages.
Hall, "RTEQ: Modeling and Validating Infinite-State Hard-Real-Time Systems", AT&T Labs Research, ASE 2007, Nov. 2007, 4 pages.
Hall, "Cheating Attacks and Resistance Techniques in Geogame Design," Proc. 2010 ACM FuturePlay Symposium, 2010, 82-89.
Hall, "An Improved Geocast for Mobile Ad Hoc Networking," IEEE Transactions on Mobile Computing, 2010, 1-14.
Illyas, "Body Personal, and Local Ad Hoc Wireless Networks", Chapter 1, CRC Press, 2003, 22 pages.
Liao et al., "GRID: A Fully Location-Aware Routing Protocol for Mobile Ad Hoc Networks", Telecommunication Systems, 2001, 18, pp. 1-26.
Shih et al., A Distributed Slots Reservation Protocol for QoS Routing on TDMA-based Mobile Ad Hoc Networks, 2004, (ICON 2004), Proceedings, 12$^{th}$ IEEE International Conference, Nov. 2004, 2, 660-664.
Shih et al., "CAPC: A Collision Avoidance Power Control MAC Protocol for Wireless Ad Hoc Networks", IEEE Communications Letters, Sep. 2005, 9(9), 859-861.
Tseng et al., "Fully Power-Aware and Location-Aware Protocols for Wireless Multi-hop Ad Hoc Networks", Proc. Of IEEE Intl. Conference on Computer Communications and Networks (ICCCn), 2002, 6 pages.
Corbett, et al. "A Partitioned Power And Location Aware MAC Protocol for Mobile Ad Hoc Networks," Technical Report No. 553, University of Sydney, School of Information Technologies, Jul. 2004, 7 pages.
Balasubramaniam, et al. "Interactive WiFi Connectivity for Moving Vehicles," Proceedings of SIGCOMM, Aug. 17-22, 2008, 12 pages.
Maihofer, "A Survey of Geocast Routing Protocols," IEEE Communications Surveys, Jun. 2004, 32-42.
Das, et al., "SPAWN: A Swarming Protocol for Vehicular Ad-Hoc Wireless Networks," Proceedings of 1$^{st}$ ACM Vanet, Oct. 2004, 2 pages.
German Aerospace Center, Simulation of Urban Mobility, 2010, http://sumo.sourceforge.net, 1 page.
Gupta, et al., "The Capacity of Wireless Networks," IEEE Transactions on Information Theory, 46(2), Mar. 2000, 17 pages.

(56) References Cited

OTHER PUBLICATIONS

Hadaller, et al., "Vehicular Opportunistic Communication Under The Microscope," Proceedings of MobiSys, Jun. 11-14, 2007, 206-219.
Heissenbüttel, et al., "BLR: Beacon-Less Routing Algorithm For Mobile Ad-Hoc Networks," Elsevier's Computer Communications Journal, 27, 2003, 15 pages.
Hall, et al., "A Tiered Geocast Protocol for Long Range Mobile Ad Hoc Networking," Proceedings of the 2006 IEEE Military Communications Conf., 2006, 8 pages.
Hull, et al., "CarTel: A Distributed Mobile Sensor Computing System," Proceedings of ACM SenSys, Nov. 2006, 14 pages.
Eriksson, et al., "Cabernet: Vehicular Content Delivery Using WiFi," Proceedings of Mobicom, Sep. 2008, 12 pages.
Karp, et al, "GPSR: Greedy Perimeter Stateless Routing for Wireless Networks," Proceedings of Mobicom, 2000, ACM 2000, 12 pages.
Kuhn, et al., "Geometric Ad-Hoc Routing: Of Theory and Practice," Proc. 2003 Symposium on Principles of Distributed Computing, ACM 2003, 10 pages.
Lee, et al., "CarTorrent: A Bit-Torrent System for Vehicular Ad-Hoc Networks," Mobile Networking for Vehicular Environments, Sep. 2007, 6 pages.
Lee, et al., "Efficient Geographic Routing in Multihop Wireless Networks," Proc. MobiHoc 2005, ACM, 2005, 12 pages.
Ni, et al., "The Broadcast Storm Problem In A Mobile Ad Hoc Network," Proceedings of the 5$^{th}$ Annual ACM/IEEE International Conference on Mobile Computing and Networking, ACM, 1999, 151-162.
Manvi, et al., "Performance Analysis of AODV, DSR, and Swarm Intelligence Routing Protocols in Vehicular Ad Hoc Network Environment," Proceedings of IEEE Future Computer and Communications, Apr. 2009, 21-25.
Niculescu, et al., "Trajectory Based Forwarding And Its Applications," Proc. Mobicom 2003, ACM, 2003, 13 pages.
Ns-2, "The Network Simulator," 2010, http://isi.edu/nsnam/ns, 2 pages.
Schwingenschlogl, "Geocast Enhancements of AODV For Vehicular Networks," ACM SIGMOBILE Mobile Computing And Communications Review, Jun. 2002, 18 pages.
Shevade, et al., "Enabling High-Bandwidth Vehicular Content Distribution," Proceedings of CoNEXT 2010, Nov. 30-Dec. 3, 2010, 12 pages.
Yassein, et al., "Performance Analysis Of Adjusted Probabilistic Broadcasting In Mobile Ad Hoc Networks," Proc. 11$^{th}$ Intl. Conf. On Parallel and Distributed Systems Workshops, 2005, 27 pages.
Zahn, et al., "Feasibility of Content Dissemination Between Devices In Moving Vehicles," Proceedings of CoNEXT 2009, Dec. 1-4, 2009, 11 pages.
Zorzi, et al., "Geographic Random Forwarding (GeRaF) For Ad Hoc and Sensor Networks: Multihop Peformance," IEEE Transactions on Mobile Computing, Dec. 2003, 11 pages.
http://askville.amazon.com/Wii-games-play-Internet-Family/AnswerViewer.do?requestId=6796582(2007).
Schutzberg, "Phone-based GPS-based Games: Missing Pieces"; http://www.directionsmag.com/articlephp?article_id=939 (Aug. 17, 2005).
"Boost Mobile introduces First Location-based, GPS games in US" http://www.physorg.com/news5824.html (Aug 16, 2005).
"Sony bigwig hints at GPS-enabled PSP games"; http:www.vespacious.com/sony-bigwig-hints-at-gps-enabled-psp-games.html (Dec. 22, 2008).
Steve:"GPS-enabled Cell Phone Games" http://www.strangenewproducts.com/2005/08/gps-enabled-cell-phone-games.html (Aug. 15, 2005.
Location-Enabled Mobile Gaming; http://www.nn4d.com/site/global/market/affiliate_sites/lbsglobe/lbsapplications/mobilegaming.jsp (2007).
Panta, "GeoV2V: Vehicular communications Using A Scalable Ad Hoc Geocast Protocol," AT&T Labs Research, Nov. 2011, 14 Pages.
Social + Gaming-SwiK: http://SWiK.net/social+Gaming, 2009, Dzone, Inc. pp. 1-20.
Various Authors, The Wikipedia page for the "Snake" computer game, Nov. 3, 2008 Version, Wikipedia.com, downloaded by the USPTO from http://en.wikipdeia.org/w/index.php?title=Snake_(video_game)&oldid=249370716 on Oct. 4, 2012.
U.S. Appl. No. 13/683,025, filed Nov. 21, 2012, Panta.
U.S. Appl. No. 13/712,353, filed Dec. 12, 2012, Hall.
U.S. Appl. No. 13/875,735, filed May 2, 2013, Hall.
U.S. Appl. No. 13/890,423, filed May 9, 2013, Hall.
Nicklas, Daniela, and Bernhard Mitschang. "On building location aware applications using an open platform based on the NEXUS Augmented World Model." Software and Systems Modeling 3.4 (2004): 303-313.
Nintendo, The computer game "Mario Kart DS", released in North America on Nov. 14, 2005, published by Nintendo, as evidenced by the game FAQ by Alex, downloaded from http://db.gamefaqs.com/portable/ds/file/mario_kart_ds_h.txt, with a game FAQ reported upload date of Jul. 15, 2007, p. 11.
Winkler, The computer game "GPS::Tron", as evidenced by the Ars Electronica organization archive document http://archive.aec.at/submission/2004/U19/1043/, where the document has an earliest archive.org verified publication date May 4, 2005, pp. 1-2.
Winkler, Additional date evidence for the Ars Electronica organization archive document http://archive.aec.at/submission/2004/U19/1043/, retrieved from http://web.archive.org/web/20050508084628/http://www.aec.at/en/archives/prix_archive/prix_project.asp?iProjectID=12899.
Aggarwal, Sudhir et al., "Accuracy in dead reckoning based distributed multi-player games", SIGCOMM '04 Workshops (Proceedings of 3rd ACM SIGCOMM Workshop on Network and System Support for Games), Aug. 30-Sep. 3, 2004, Portland, Oregon, pp. 161-165.
Bjerver, Martin, "Player Behaviour in Pervasive Games—using the City as a Game Board in Botfighters", Master of Science Thesis, KTH Computer Science and Communication, Stockholm, Sweden, 2006.
bzflag(6):tank battle game—linux man page, Google date Feb. 1, 2001, downloaded from http://linux.die.net/man/6/bzflag.
de Souza e Silva, Adriana, "Alien revolt (2005-2007): A case study of the first location-based mobile game in Brazil", IEEE Technology and Society Magazine, Spring 2008, pp. 18-28.
Dialogic, "Adding location based services to existing architectures", Application Note: Location-Based Services, 9862-2, Oct. 2007, 14 pages, downloaded from http://www.dialogic.com/-/media/products/docs/signaling-and-ss7-components/9862_Add_Locationbased_Servs_an.pdf.
Gallagher, Sean, "Army prepared test of new wireless war game gear", Defense Systems, Jul. 7, 2008, downloaded from http://defensesystems.com/articles/2008/07/army-prepares-test-of-new-wireless-war-game-gear.aspx.
Halas, Jacek, "Ghost Recon: Advanced Warfighter Game Guide, [Mission 01] Contact!—Objective: Locate Ramirez with the Drone", 2007, downloaded from http://guides.gamepressure.com/ghostreconadvancedwarfighter/guide.as!ID=986.
Hohfeld, Alexander, "In and out of reality: Janus-faced location awareness in ubiquitous games", Journal of Software, 2(6), Dec. 2007, 86-92.
Kim, Seong-Whan et al., "Kalman filter based dead reckoning algorithm for minimizing network traffic between mobile nodes in wireless GRID", Embeded and Ubiquitous Computing, Lecture Notes in Computer Science, 4096, 2006, 162-170.
Lindo, Wayne A. et al., "Network modeling and simulation in the OneTESS program", Fall Simulation Interoperability Workshop 2006, Orlando, Florida, USA, Sep. 10-15, 2006, 155ff.
MyCheats web page, "Ghost Recon: Advanced Warfighter Superguide, Reach Ramirez", (Jul. 19, 2006), downloaded from http://mycheats,1up.com/view/section/3139558/18404/ghost_recon_advanced_warfighter/pc.
Santos, Nuno et al., "Vector-field consistency for ad-hoc gaming", Middleware 2007, LNCS 4834, 2007, pp. 80-100.
Sotamaa, Olli, "All the world's a Botfighter Stage: Notes on location-based ulti-user gaming", Proceedings of Computer Games and Digital Cultures Conference, Tampere University Press, 2002, pp. 35-44.

* cited by examiner

SECURE MOBILE AD HOC NETWORK

TECHNICAL FIELD

The technical field generally relates to mobile ad hoc networks and more specifically to security for mobile ad hoc networks.

BACKGROUND

Mobile ad hoc networks are wireless networks comprising nodes that transfer packets peer-to-peer, without the packets necessarily traversing routers, access points, or other infrastructure. Nodes in a mobile ad hoc network are capable of moving around rapidly and dropping in and out of contact frequently and for potentially unbounded periods of time. As such, maintaining security against eavesdropping, integrity, and other security attacks can be difficult in a mobile ad hoc network.

SUMMARY

Security in a mobile ad hoc network is maintained by using various forms of encryption, various encryption schemes, and various multi-phase keying techniques. Security is based on shared keys, key encryption keys, and over the air re-keying. In an example configuration, a three-phase re-keying technique is utilized to ensure that no authorized nodes are lost during re-keying and that nodes that are intended to be excluded from re-keying are excluded. In another example configuration, a two-phase keying technique is utilized to maintain backwards secrecy. Example mobile ad hoc networks can include nodes, such as smart phones or the like, operated by: TSA employees at an airport, players of a distributed game, individuals during military training, individuals in tactical situations (e.g., swat teams), individuals involved with public safety, individuals involved with responding to emergencies, and individuals involved with consumer messaging.

DETAILED DESCRIPTION OF ILLUSTRATIVE EMBODIMENTS

Figure 1:
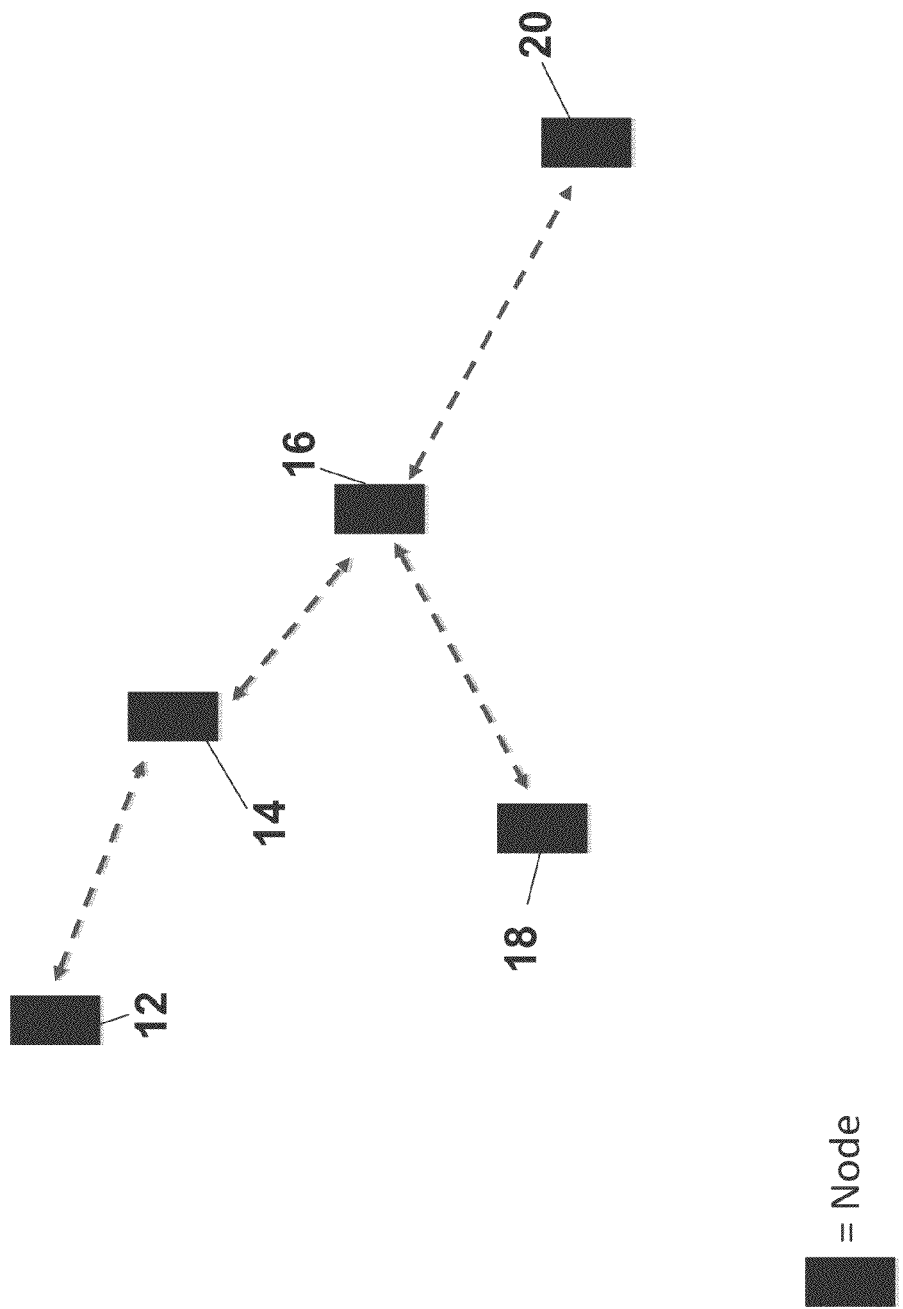
FIG. 1 illustrates an example secure mobile ad hoc network.

Security is maintained in a secure mobile ad hoc network via various forms of encryption, various encryption schemes, shared keys, key encryption keys, and various over the air multi-phase keying techniques. The herein described security mechanisms address the challenges presented by mobile ad hoc networks, such as, network disconnections among authorized nodes for extended periods of time without losing authorized contact, backward secrecy, and mobile ad hoc networking. For example, in various embodiments, packets and/or payloads are encrypted using appropriate encryption techniques. A three-phase re-keying mechanism is utilized to ensure that no authorized nodes are lost during re-keying and that nodes that are intended to be excluded from re-keying, actually are excluded. And, a two-phase keying technique is utilized to maintain backward secrecy.

Backwards secrecy refers to the ability to prevent an attacker from recording communication traffic and if a key is compromised, gaining unauthorized access to the recorded traffic. In a mobile ad hoc network, as time progresses, each mobile node potentially becomes a progressively more valuable target because, by compromising a mobile node, an attacker can potentially decrypt all previous traffic (e.g., assuming previous traffic has been recorded). Thus, to mitigate this type of unauthorized access, a two-phase keying technique is utilized to maintain backward secrecy.

Mobile ad hoc networks extend the reach of data networking into areas and scenarios in which infrastructure-based networking is impossible or impractical. For example, mobile ad hoc networks can allow first responders to use networked messaging and information applications in a zone where the network infrastructure has been destroyed by a disaster. Mobile ad hoc networks can provide military units operating in battlefield situations lacking infrastructure the same types of benefits as infrastructure-based networks. Mobile ad hoc networks can allow networking among low resource nodes, such as man-worn devices powered by lightweight wearable batteries, by allowing units to relay each other's short-range transmissions, instead of each unit transmitting long range directly to the destination. Some mobile ad hoc networks, such as military mobile ad hoc networks, require high security, due to the life-critical nature of battlefield secrecy.

Due to the practical realities of wireless networking of mobile nodes, mobile ad hoc networks are difficult to secure. Any wireless capable device can transmit and receive just by being near a mobile ad hoc network. Key distribution is complicated by nodes being out of contact due to complex radio environments. Routing and geographical awareness are problematic when nodes move around rapidly. Also due to the high degree of dynamism, and depending upon a particular application, it may be necessary for a node to interact securely with any other node at any time, with low latency. Further, in large scale mobile ad hoc networks, due to the relative scarcity of wireless resources and poor scaling laws governing mobile ad hoc networks, it is necessary to be as parsimonious as possible with network traffic.

To better understand the herein described security mechanisms, a description of mobile ad hoc networks is provided. A mobile ad hoc network comprises communications devices (also referred to as nodes) that communicate with each other via geographical broadcasting, referred to as geocasting.

Geocasting is described in U.S. Pat. No. 7,525,933, entitled "System And Method For Mobile Ad Hoc Network," filed Nov. 30, 2005, issued Apr. 28, 2009, and incorporated by reference herein in its entirety. Geocasting uses a protocol in which an IP address is replaced with a geographic address. Thus, each geocast message comprises an indication of a location of a geographic region of intended reception of the geocast message. Generally, a packet is sent to every communications device located within a specific geographic region. The packet can contain an indication of the location of the sender, an indication of the geographic region, a payload, or a combination thereof, or the like. The communications devices in the geographic region, and any other communications devices that can communicate with them, are referred to, collectively, as a mobile ad hoc network. No registration is required to become a member of the mobile ad hoc network. Any communications device in the mobile ad hoc network can send a message to any or every communications device in the mobile ad hoc network. As communications devices move within communications range of any member of the mobile ad hoc network, they can become members of the mobile ad hoc network without requiring registration. The communications devices of the ad hoc network of communications devices communicate with each other. The ad hoc network of communications devices does not require base station terminals to control communications between the mobile devices. In example embodiments, base stations or routers may be used to relay messages between different mobile ad hoc networks, or to use other network transports such as other traditional internet protocol networks, such as the internet, to bridge messages between mobile ad hoc networks. Each communications device is capable of receiving and/or transmitting data packets to and/or from other communications devices in the mobile ad hoc network.

In an example embodiment, a communications device transfers packets to other communications devices according to heuristic decision rules that determine whether a receiving device will re-transmit a received packet. These rules effectively guide packets to their destinations and control communication traffic within the ad hoc network. The decision rules achieve this control by using statistics obtained and recorded by a communications device as it receives packets transmitted within reception range within its environment. This distributed packet transfer mechanism results in packets "flowing" to and throughout the geocast region specified in each packet. The communications devices in the geocast region receive and process each distinct packet, typically rendering the content to the user via a user interface of a communications device. Two packets are distinct if they contain distinct geocast identifiers. However, a re-transmitted copy of a packet generally will contain the same geocast identifier as the original packet.

FIG. 1 illustrates an example secure mobile ad hoc network. Communications devices (nodes) in the mobile ad hoc network can communicate via RF encoded with geographic information, via Bluetooth technology, via WiFi (e.g., in accordance with the 802.11 standard), or the like, or any combination thereof. For example, as depicted in FIG. 1, communication devices 12, 14, 16, 18, and 20 form a mobile ad hoc network. As shown in FIG. 1, communication device 12 communicates with communications device 14 directly (e.g., via Bluetooth). Communication device 14 communicates with communications device 16, and thus can retransmit information received from communications device 12 to communications device 16, and vice versa (retransmit information received from communications device 16 to communications device 12). Communications device 16 communicates with communications devices 18 and 20, and can relay information from/to communications devices 18 and/or 20 to/from communications devices 12 and/or 14.

Although not depicted in FIG. 1, it is possible, in a mobile ad hoc network, that, for a pair of nodes (A and B for example), node A can receive from node B but node B can not receive from node A. This asymmetric style of communication is potential likely in a mobile ad hoc network.

In an example embodiment, communications devices that receive a message can resend the message in accordance with the scalable wireless geocast protocol. For example, a communication device's ability to retransmit a message can be based on the number of times the message was previously received, the communication device's proximity with respect to the communications devices from which the message was sent, and/or the communication device's proximity to the geocast region. This can be implemented as a three step location-based approach, which is described in detail in the aforementioned U.S. Pat. No. 7,525,933, entitled "System And Method For Mobile Ad Hoc Network," filed Nov. 30, 2005, issued Apr. 28, 2009. First, in accordance with the location-based approach, the receiving communication device determines whether it has previously received the same message at least a predetermined number (N) of times. If not, it retransmits the message over the ad hoc network of communications devices. If so, the communications device progresses to the second step and determines whether the sending communications device is closer than some minimum distance away. If no prior transmitter of the message was closer than some minimum distance away, the communications device retransmits the message over the ad hoc network of communications devices. Otherwise, the communications device progresses to the third step and determines whether it is closer to the center of the geocast region than any sending communications device from which the message was received. If so, the communications device transmits the message over the ad hoc network of communications devices. If not, the communications device does not retransmit the message.

This location-based approach prevents the receiving communications device from retransmitting a message that was most likely already retransmitted by another communications device located close to it (and thus most likely reaching the same neighboring communications devices that it can reach). In addition, this location-based approach reduces the chance that the communications device will retransmit the same message multiple times to the same neighboring communications devices.

As mentioned, a mobile ad hoc network does not require a communications network infrastructure or a WiFi access point. However, in an example configuration, a mobile ad hoc network can utilize WiFi access points and/or a communications network infrastructure.

Figure 2:
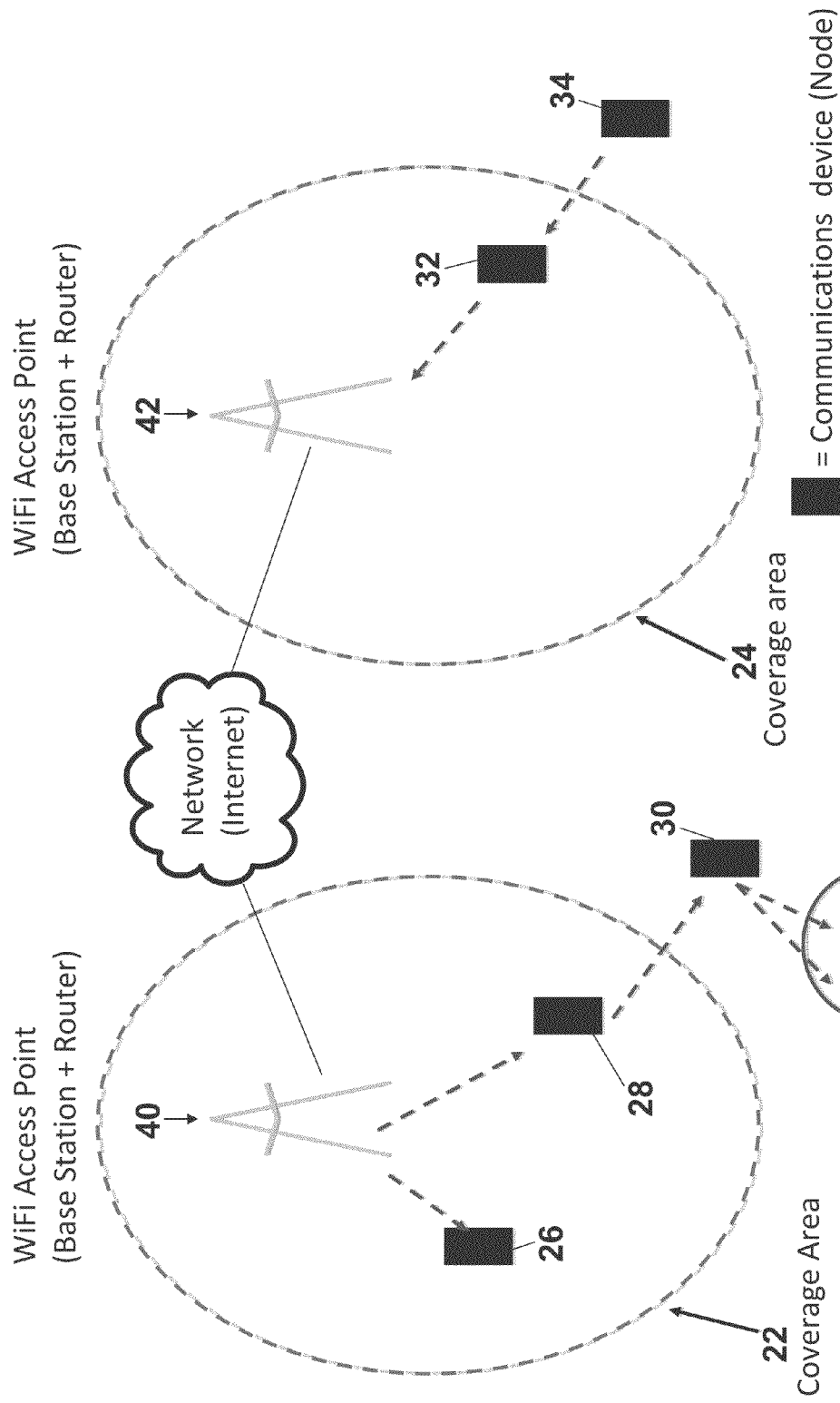
FIG. 2 illustrates example communications in an ad hoc network via a WiFi access point.

FIG. 2 illustrates example communications in an ad hoc network via a WiFi access point. As depicted in FIG. 2, communication devices 26, 28, 30, 36, and 38 form a mobile ad hoc network and communication device 32 and 34 form another mobile ad hoc network. Coverage area 22, which is the area covered by a WiFi access point 40, covers communication devices 26 and 28. Coverage area 24, which is the area covered by another WiFi access point 42 covers communication device 32. As shown in FIG. 2, communication device 34 transmits to communication device 32 directly (e.g., via Bluetooth). Communication device 32 retransmits to a WiFi access point 42 which in turn retransmits to the other WiFi access point 40. Communication devices 26 and 28 receive the transmission from the WiFi access point 40, and communication device 28 retransmits directly to communication device 30. And, as depicted, communication device 30 retransmits to other communication devices 36 and 38.

Figure 3:
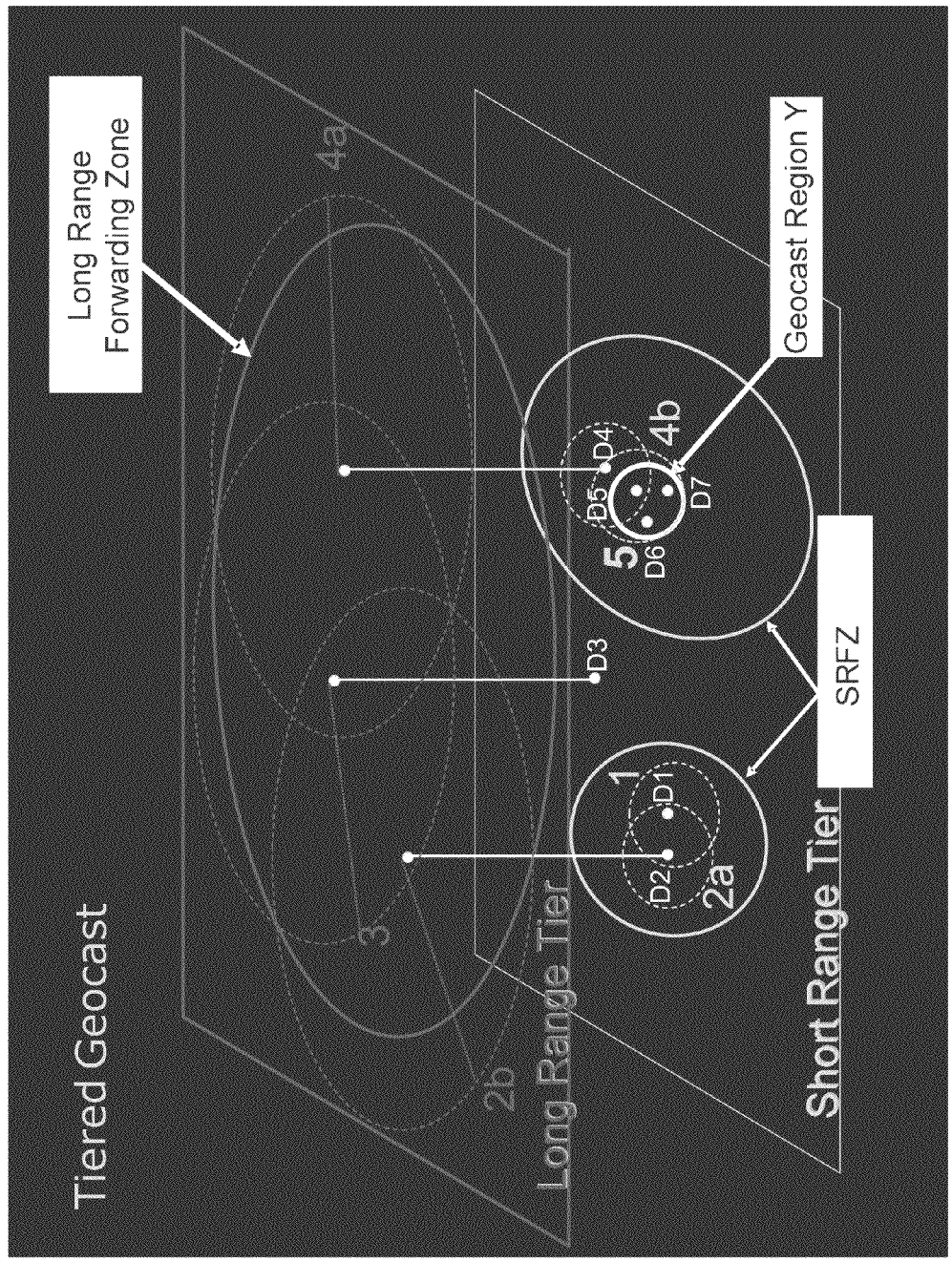
FIG. 3 illustrates an example mobile ad hoc network utilizing tiered geocasting and forwarding zones.

FIG. 3 illustrates an example mobile ad hoc network utilizing tiered geocasting and forwarding zones. Tiered geocasting uses long range (LR) transmitters (such as communications devices, etc), infrastructure, a communications network, a cellular tower, or a combination thereof, when available. Tiered geocasting assumes that at least one tier is usable by at least one of the communications devices. A long range tier is a tier wherein characteristic message transfers between devices occur over a longer physical range than those over some other tier. A long range tier can be wireless, wired, or a combination thereof.

A forwarding zone can be utilized to implement tiered geocasting. A common forwarding zone can be defined for all geocast packets or different forwarding zones can be defined for each type of geocast packet. Forwarding zones (as shown in FIG. 3, for example and without limitation) can be defined differently in different tiers, even for the same packet type or even same packet. Thus, forwarding heuristics can be applied independently per tier, with bridging at multi-tier capable nodes. In an example embodiment, a communications device retransmits a packet only if the communications device is located within the forwarding zone defined for the packet's type. This determination is in addition to the determinations described above and, if the communications device is not in the forwarding zone, the packet will not be retransmitted, even if one or more of the above conditions would otherwise have caused a retransmission hold.

As depicted in FIG. 3, nodes (e.g., communications devices) D1, D2, D3, D4, D5, D6, and D7, are at various locations within short range (SR) and long range (LR) tiers. All of devices D1, D2, D3, D4, D5, D6, and D7 together form a mobile ad hoc network, with devices D5, D6, and D7 being located in geocast region Y, hence being targets of a message sent by D1. Each communications device D1, D2, D3, D4, D5, D6, and D7 can determine its own geographical location through any type of location determination system including, for example, the Global Positioning System (GPS), assisted GPS (A-GPS), time difference of arrival calculations, configured constant location (in the case of non-moving nodes), any combination thereof, or any other appropriate means. Each communications device is operable to transmit and receive packets on a mobile ad hoc network. In addition, at any given time, some subset (possibly all) of the communications devices may be operable to transmit and receive packets over the long range tier network. For example, though not a limitation, in FIG. 3, devices D2, D3, and D4 can transmit and receive messages over both the short and long range tiers. Note that this latter fact is indicated visually in the diagram by D2, D3, and D4 each having two dots (one in the short range tier and one in the long range tier) connected by a vertical line. The long-rang tier network can be any network in which packets can be transmitted from one long range capable communications device to another long range capable communications device. Such packet networks can include, for example, an infrastructure-based network comprising wireless base stations (for up- and down-link) operating on a separate frequency from that used by an ad hoc network. In addition, the long rang tier network also could be implemented simply as another instance of an ad hoc network using distinct radio frequencies and possibly longer radio ranges.

Communications device D1 transmits the message, and communications device D2 receives the transmission from communications device D1. Communications device D2 retransmits (transmission 2a), within the short range tier and in accordance with the heuristics for the short range forwarding zone (SRFZ) as well as within the long range tier (transmission 2b). Communications D2, with long range transmission capability (in the long range tier) retransmits in the long range tier as well (transmission 2b). Communications device D3 receives the transmission 2b from communications device D2 and retransmits (as transmission 3) in the long range tier only. Communications device D4 receives the transmission 3 from communications device D3 and retransmits both on the long and short range tiers, resulting in transmission 4a in the long range tier and 4b in the short range tier. Communications device D5, within geocast region Y, receives the transmission 4a, and in turn retransmits (transmission 5) within the geocast region Y. Transmission 5 is received by the other devices in geocast region Y, namely devices D6 and D7, thus completing the geocast message transfer.

As mentioned above, the herein described security mechanisms utilize various encryption schemes. In an example configuration, each node of a mobile ad hoc network encrypts each entire packet prior to providing the packet. In this example configuration, the next hop MAC (Media Access Control) address and the source MAC address for unicasts are transmitted in the clear (unencrypted). Accordingly, each node receiving the encrypted packet, decrypts the packet upon reception. All nodes in the mobile ad hoc network share a set of active session keys. Each packet is encrypted/decrypted with one of the shared active session keys. The cipher text of the message includes an identifier for the key used. In an example embodiment, the key identifier is a globally unique character string. The key identifier can be generated by any appropriate entity. For example, the key identifier can be generated by the entity that generates the key. In various embodiments, the key identifier is made globally unique by including information such as device hardware ID, universal time, and/or other locally node-specific information.

As described in more detail below, each node encrypts using the newest active shared session key that it knows is possessed by others nodes in the mobile ad hoc network, while accepting packets encrypted in older active shared session keys until the older active shared session keys are revoked by a controller in the mobile ad hoc network. The controller can comprise any appropriate entity. For example, any node in the mobile ad hoc network can function as the controller. Functions of the controller can be performed as adjunct to a node in the mobile ad hoc network and/or the controller can be dedicated only to performing controller functions. In various example configurations, a controller can generate shared session keys and KEKs, generate key identifiers, manage key distribution and change methods, and/or provide a user interface to a trusted human security controller role.

Controller handover could occur when one controller (node A for example) is being deactivated or leaving the mobile ad hoc network and another (node B for example) is present to take over. Handover could occur when the two node, A and B, are in communications contact. Control could be handed over in any appropriate manner. For example, control could be handed over from node A to node B via any appropriate remote process migration technique. In an example scenario, node A could halt security control operations on the mobile ad hoc network. (Node A stops changing its state.) The run-time state of node A (e.g., as stored in memory of node A with/without an associated disk storage such as a database) could be encrypted and transferred via a network message or the like to node B. Encryption could be accomplished using a known controller-exchange key that is known to each of node A and node B. Once the encrypted state is received by node B, the message could be decrypted and installed on node B. Node B can provide acknowledgement of successful receipt and installation to node A. Node A would subsequently be deactivated as the controller. Node B could then start executing at the point that node A left off (the point at which node A stopped changing state).

In an example embodiment, all packets include predetermined fixed bits that enable the nodes to determine whether a packet has been decrypts correctly. For example, predetermined fixed bits could comprise a character string. In an example embodiment, a hash function could be computed over the payload and header of the message. The resulting hash value could be included in the encrypted payload. upon decryption, the hash function is recomputed and the two hash values are compared. That is, the hash value read from the message is compared with the hash value resulting from the decrypted bits. If the has values are not the same (fail to match), the message could be considered invalid and the message could be ignored.

Any packet failing to decrypt correctly is simply discarded silently, as if it were not received. In this way, no unauthorized wireless nodes can insert packets into the network nor can they eavesdrop, unless they have compromised a node or successfully attacked the cipher. Any appropriate encryption and/or encryption technique can be utilized. In an example embodiment, a symmetric block cipher, such as AES is utilized. Public key cryptographic techniques could be utilized. In an example implementation, a block cipher in cipher block chaining (CBC) mode is utilized, with a leading initialization vector block. In an example embodiment, the initialization vector is a vector of random bits. The random bits could be generated in any appropriate manner. For example, the random bits could be generated randomly (e.g., from noise, from atmospheric radio noise, etc.), pseudorandomly, or a combination thereof.

Figure 4:
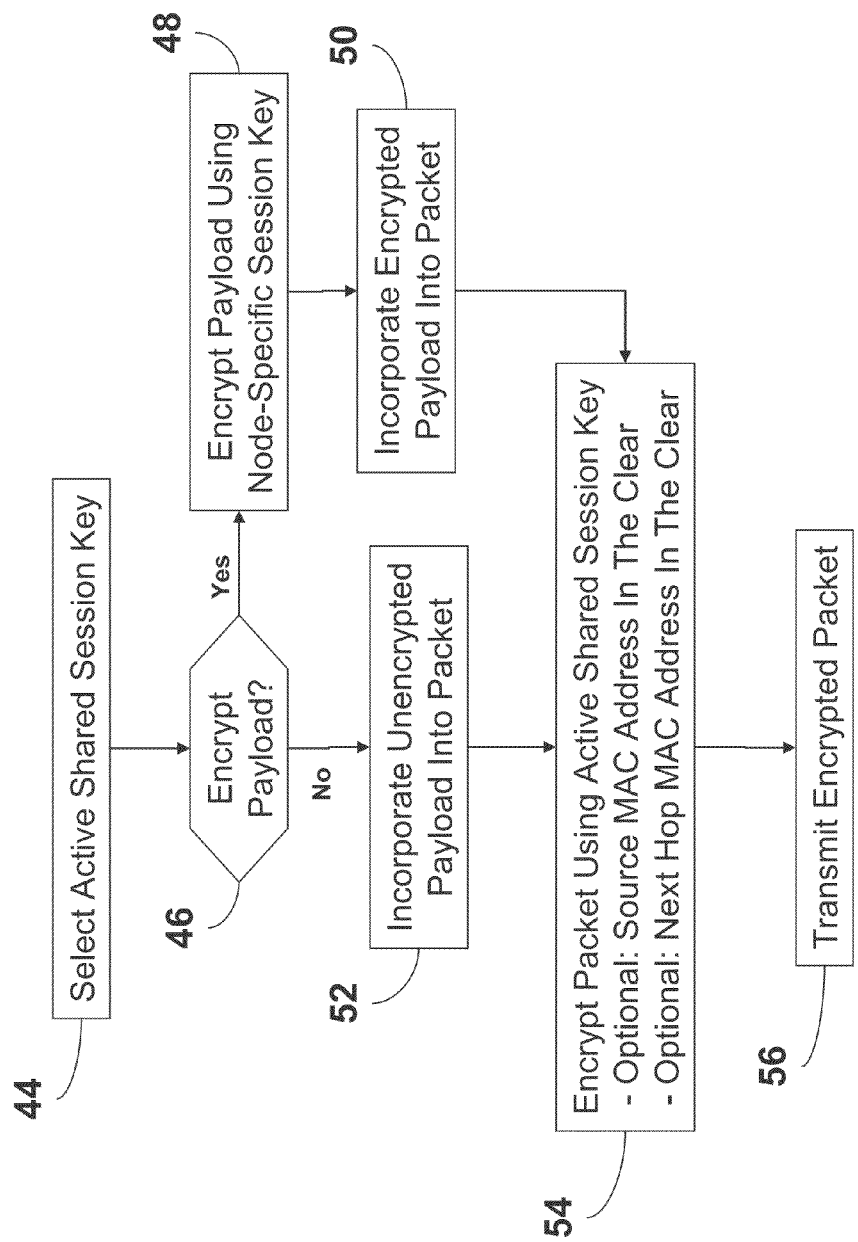
FIG. 4 is a flow diagram of an example process for securely transmitting a packet in an in a secure mobile ad hoc network.

FIG. 4 is a flow diagram of an example process for securely transmitting a packet in an in a secure mobile ad hoc network. At step 44, an active shared session key is selected by a node. In various example embodiments, the payload of a packet may be separately encrypted. That is, the payload may be separately encrypted with respect to the packet. For some applications, it may be desirable for one mobile ad hoc network node to communicate information securely to another mobile ad hoc network node without allowing other mobile ad hoc network nodes to decrypt the information. In such cases, payload encryption is utilized. In an example embodiment, the payload is encrypted using individual node-specific session key for each node issued by the controller. These node-specific session keys are different for each node and separate from the aforementioned shared session keys and key encryption keys.

Node-specific session keys can be set up between two nodes in any of various ways. For example, a secure key exchange protocols can be executed between two nodes using only packets without payload encryption first. Once the shared node-specific session key is determined by the protocol, the nodes can subsequently use it for payload encryption. In another example embodiment, the security controller node can generate node specific keys and send them to the nodes involved, wherein the node specific keys could be encrypted using the KEKs.

In an example implementation, the payload is encrypted prior to and therefore in addition to encryption of the packet using the node-specific shared session key. First, the sender encrypts the payload in the node-specific shared session key of the recipient; then the entire packet is encrypted with shared session key. Thus, as shown in FIG. 4, upon selecting an active shared session key, it is determined by the node, at step 46, if the payload is to be encrypted. If the payload is to be encrypted, the payload is encrypted using the node-specific session key at step 48. The encrypted payload is incorporated into the packet at step 50. The encrypted payload can be incorporated into the packet in accordance with any appropriate scheme, protocol, or the like. If it is determined, at step 46, that the payload is not to be encrypted, the unencrypted payload is incorporated into the packet at step 52. The unencrypted payload can be incorporated into the packet in accordance with any appropriate scheme, protocol, or the like. At step 54 the packet is encrypted using the active shared session key. In various example embodiments, the source MAC address and/or the next hop MAC address, optionally, may or may not be encrypted. In one example embodiment, the source MAC address and the next hop MAC address are not encrypted, and thus transmitted in the clear along with the encrypted packet at step 56.

Figure 5:
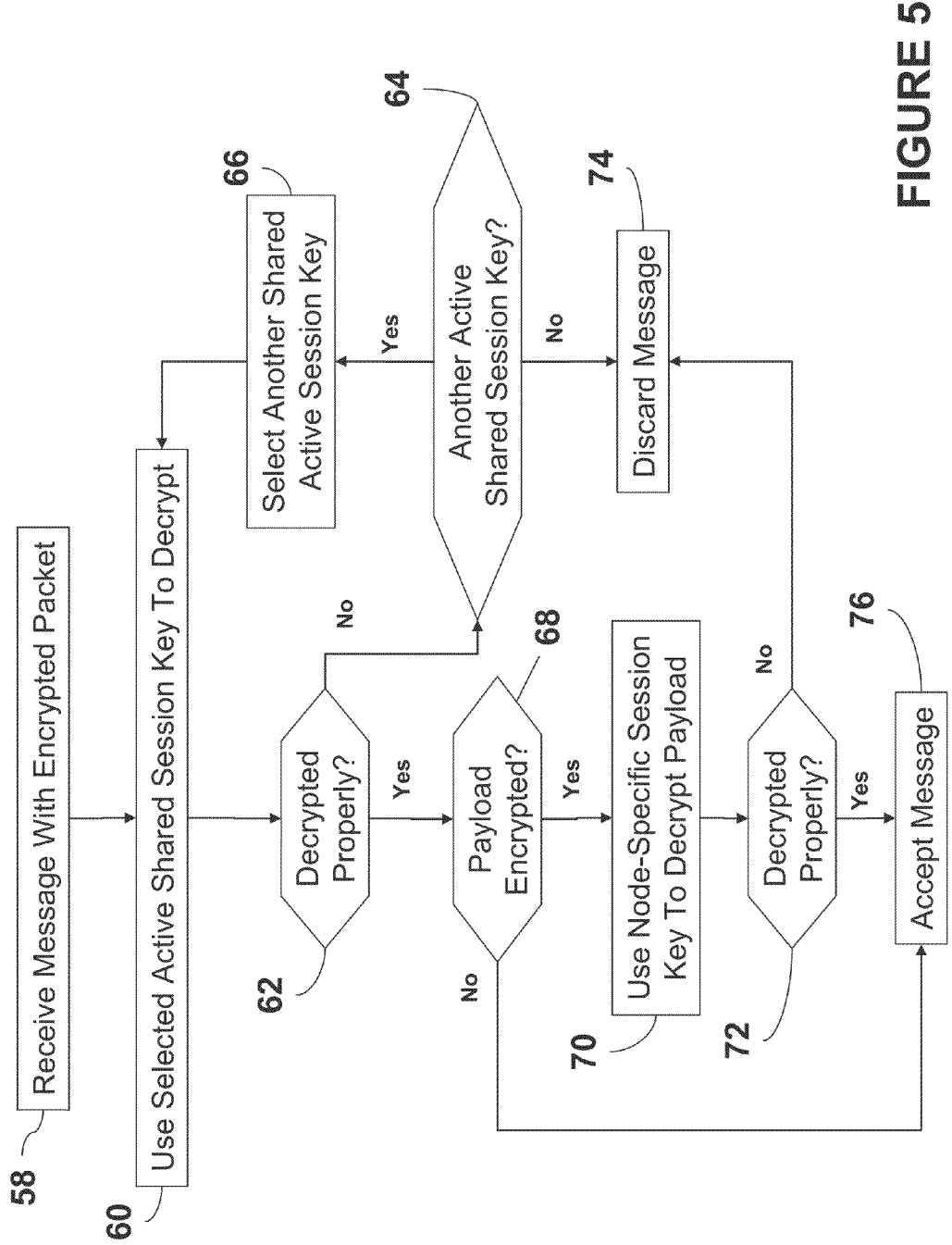
FIG. 5 is a flow diagram of an example process for securely receiving a packet in a secure mobile ad hoc network.

FIG. 5 is a flow diagram of an example process for securely receiving a packet in a secure mobile ad hoc network. At step 58, a message with an encrypted packet is received by a node. At step 60, an active shared session key is selected to decrypt the received encrypted packet. At step 62, it is determined if the encrypted packet decrypted properly. If, at step 62, it is determined that the message did not decrypt properly, it is determined at step 64, if another active session key is available to decrypt the pack. If another shared active session key is not available to decrypt the packet, the message is discarded at step 74. If, at step 64 it is determined that another shared active session key is available to decrypt the packet, another active shared session key is selected at step 66. And, the selected active shared session key is used to decrypt the encrypted packet at step 60. At this point the process continues by proceeding to step 62.

If, at step 62, the encrypted packet decrypted properly, it is determined at step 68 if the payload was encrypted. If, at step 68 it is determined that the payload was not encrypted, the message is accepted at step 76. If, at step 68 it is determined that the payload was encrypted, the payload is decrypted using the notice of a session key at step 70. At step 72, it is determined if the payload decrypted properly. If the payload did not decrypt properly at step 72, the message is discarded at step 74. If, at step 72, the payload did decrypt properly, the message is accepted at step 76.

In an example embodiment, each node in a mobile ad hoc network is configured with a key encryption key (KEK) known only to the node and to the controlling node (controller) in the mobile ad hoc network. Nodes can be configured with the KEK in any appropriate manner. For example, a request for a KEK could be made to the controller. And, a node could be configured with the KEK prior to joining the mobile ad hoc network via a software download to the node via the Internet, via insertable memory, via an over the air download, or the like. The KEK can comprise any appropriate type of key. In an example embodiment, the KEK can comprise a symmetric cryptographic key that can be used with a symmetric block cipher such as AES (Advanced Encryption Standard). In another example embodiment, the KEK can comprise an asymmetric cryptographic key that can be used with a public key cryptographic system such as, for example, the RSA system. In various configurations, the KEK is used to transfer keys from the controller to nodes in the mobile ad hoc network. The KEK can be used to transfer shared session keys, node-specific payload session keys, and/or any other appropriate key. The KEK can be generated in any appropriate matter. For example, the KEK can be generated pseudorandomly, randomly, selected from a group of keys, via a predetermined algorithm, or any combination thereof. The KEK can be generated by any appropriate device or processor. For example, the KEK can be generated by the controller of the mobile ad hoc network, generated by another processor and provided to the controller, or any combination thereof.

In an example embodiment, the controller selects a KEK associated with a node and uses the selected KEK to transfer a new key (e.g., a shared session key, a node-specific payload encryption session key) to the node in the mobile ad hoc network. The controller encrypts the new key using the selected KEK and incorporates the encrypted key into the payload portion of the key transfer packet message. And, the message is sent from controller to the appropriate node in the mobile ad hoc network. Upon receipt of the key transfer message, the receiving node decrypts the payload portion of the transfer packet message to obtain the KEK.

Re-keying may be desirable in some cases. For example, if a node is believed to have been compromised and/or defective, new keys can be provided to other nodes in the mobile ad hoc network. In an example environment, a new shared session key can be provided, by the controller, to the other nodes in the mobile ad hoc network. However, due to the nature of communication between nodes in a mobile ad hoc network, re-keying nodes in a mobile ad hoc network is problematic. In a mobile ad hoc network, nodes may be communicating with each other while the controller is trying to send a new key and/or nodes may be out of communication for periods of time. Accordingly, a multiphase re-keying technique is utilized to implement over the air re-keying in a mobile ad hoc network.

Figure 6:
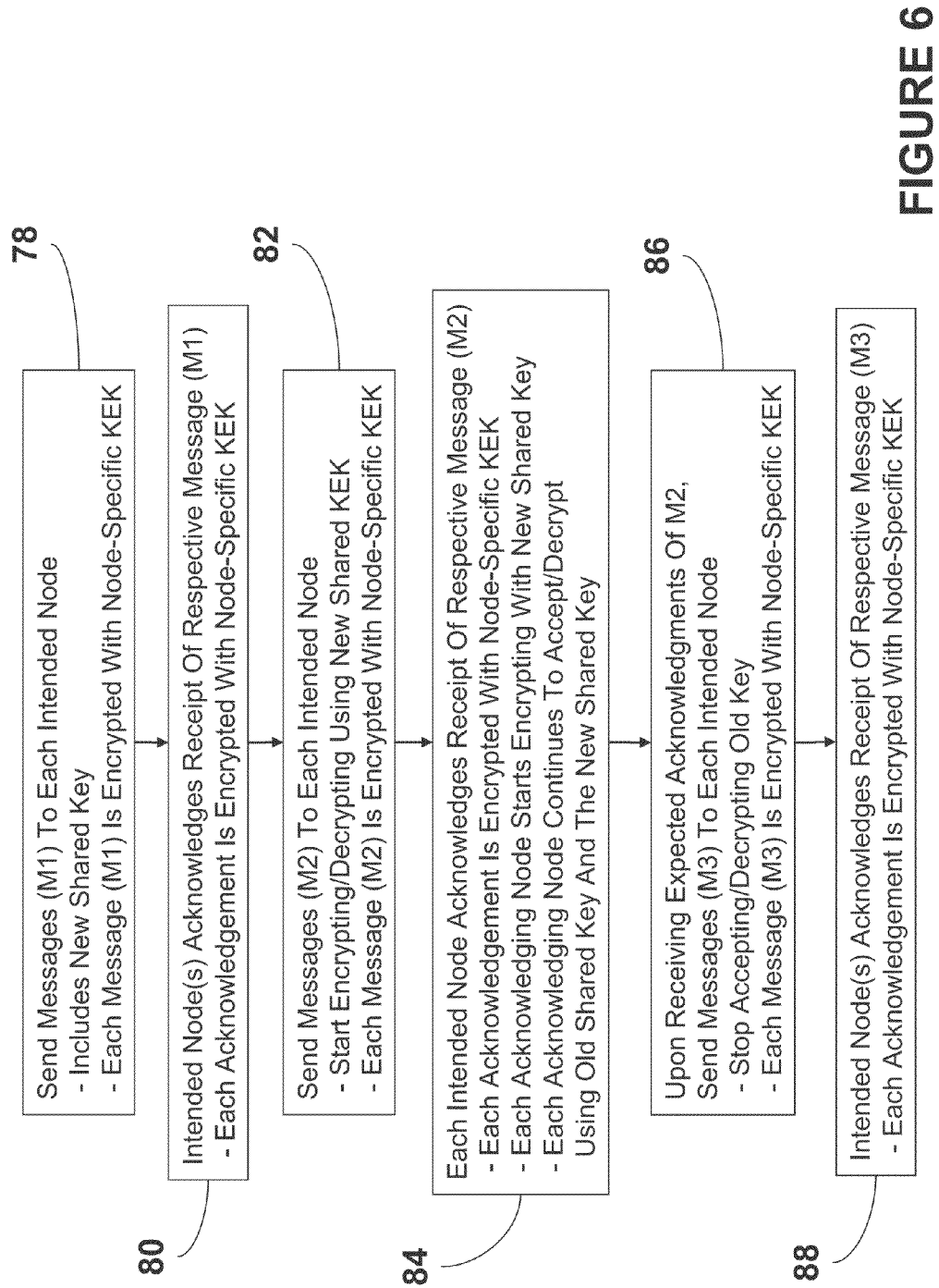
FIG. 6 is a flow diagram of an example process for providing a key to nodes in a secure mobile ad hoc network.

FIG. 6 is a flow diagram of an example process for providing a key to nodes in a secure mobile ad hoc network. At step 78, the controller sends a message, M1, two each intended node of the mobile ad hoc network. As depicted in FIG. 6 a new shared key is being provided to nodes of the mobile ad hoc network. However, it is to be understood that any key can be provided to the nodes of the mobile ad network in accordance with the process depicted in FIG. 6. In an example embodiment, the new shared key is encrypted, prior to transmission, using the node specific KEK that is specific for the node to receive the new session key. Thus if n nodes are to be sent a new shared key, the controller would encrypt the new shared key using n different KEK's, each KEK associated with a respective node of the n nodes. In an example embodiment, the encrypted new shared key is incorporated into the payload portion of the message to be sent.

When a node of the mobile ad hoc network receives the message, M1, the recipient node uses its node specific KEK to decrypt the appropriate portion of the message (e.g., the payload of the message packet). If the message decrypts correctly, the node acknowledges receipt of the message, M1, at step 80, to the controller. In an example embodiment, the acknowledgment message is encrypted with the node specific KEK. Once the controller has received acknowledgements from all nodes it wishes to reach (intended nodes), the controller sends a second message, M2, to each intended node at step 82. The message, M2, provides an indication to each node receiving the message, M2, to start encrypting communications with other nodes using the new shared key that was received via the message, M1. In an example embodiment, each message, M2, is encrypted, prior to transmission, using a respective node specific KEK for each intended node.

When a node of the mobile ad hoc network receives the message, M2, the recipient node uses its node specific KEK to decrypt the appropriate portion of the message (e.g., the payload of the message packet). If the message decrypts correctly, the node acknowledges receipt of the message, M2, at step 84, to the controller. In an example embodiment, the acknowledgment message is encrypted with the node specific KEK. At this point, each node that has received the message, M2, will encrypt messages using the newly received shared session key, and will decrypt messages using the newly received shared session key and the previous shared session key.

Once the controller receives all M2 acknowledgements it expects, the controller sends out a third message, M3, to each intended node at step 86. The message, M3, provides an indication to each node receiving the message, M3, to stop decrypting messages from other nodes using the old shared key, and to use only the new shared key that was received via the message, M1. In an example embodiment, each message, M3, is encrypted, prior to transmission, using a respective node specific KEK for each intended node.

When a node of the mobile ad hoc network receives the message, M3, the recipient node uses its node specific KEK to decrypt the appropriate portion of the message (e.g., the payload of the message packet). If the message decrypts correctly, the node acknowledges receipt of the message, M3, at step 88, to the controller. In an example embodiment, the acknowledgment message is encrypted with the node specific KEK.

At this point, if the controller has received all expected acknowledgements for messages, M3, the controller knows the re-keying has completed and all intended nodes are now using the new key and rejecting the old key.

In an example embodiment, each acknowledgement (to M1, M2, M3) includes the ID of the new key, which changes for each key. This provides a nonce making each acknowledgement result in new cipher text, thus mitigating/preventing replay attacks. In an example embodiment, if at any stage a node fails to acknowledge a message, the controller can resend the previous message a fixed (e.g., a predetermined number of times, of number of times determined at the time, etc.). If all such attempts fail, then the node can be assumed compromised and/or lost and excluded from further messaging. At this point, re-keying could be initiated, since the lost node may have already received the new key which, if the node was compromised, could itself be compromised.

As described thus far, the design has the property that as time progresses, each mobile node can become a more valuable target because of the history of data accumulated in a node. If compromised, an attacker could potentially decrypt all previous traffic, assuming it has been recorded. Thus, to maintain backward secrecy, in an example embodiment, a multiphase re-keying scheme is utilized.

Figure 7:
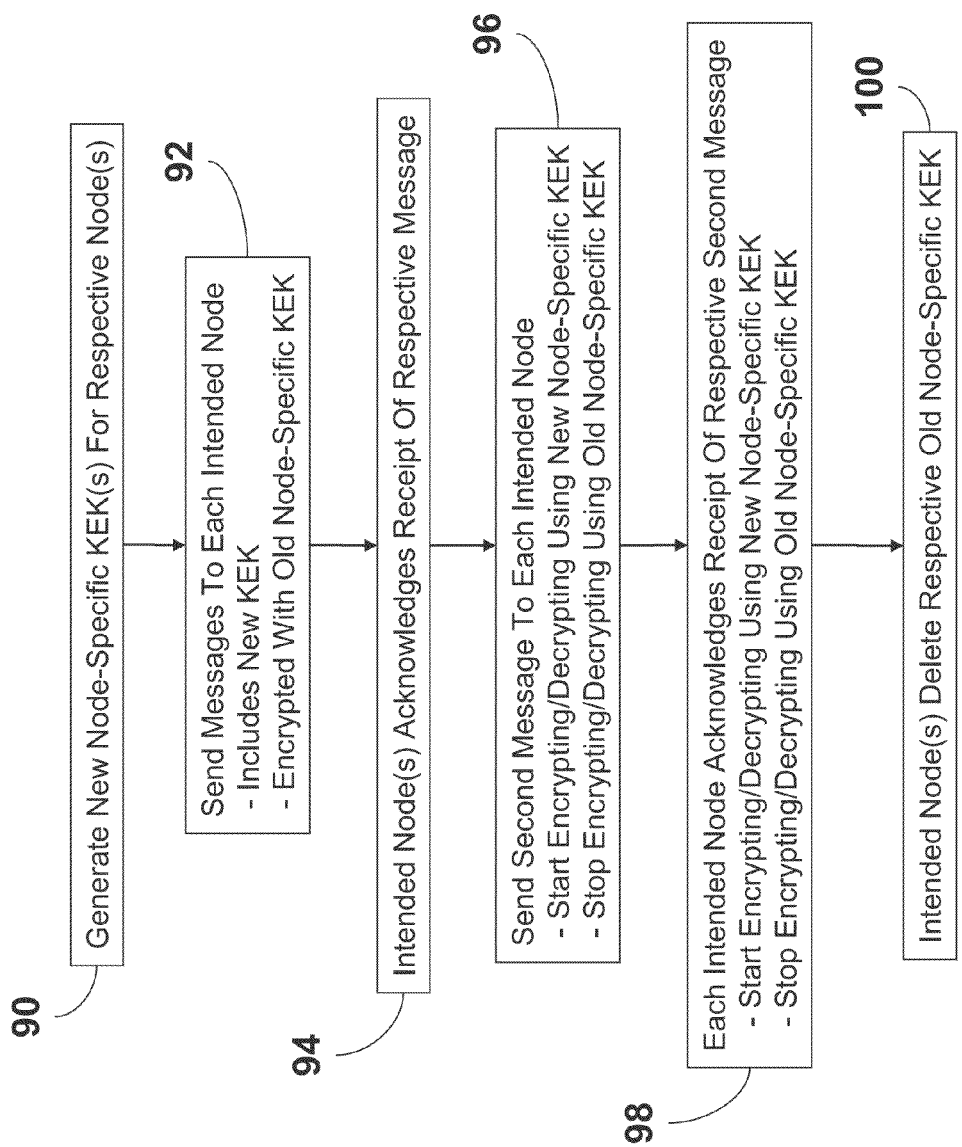
FIG. 7 is another flow diagram of an example process for providing a key to a node of a secure mobile ad hoc network.

FIG. 7 is another flow diagram of an example process for providing a key to a node of a secure mobile ad hoc network. The process depicted in FIG. 7 can be implemented periodically, can be triggered by any appropriate event, can be implemented on demand, or combination thereof. At step 90, the controller generates a new node-specific KEK for each respective node of the mobile ad hoc network. At step 92, the controller sends a message containing a new node-specific KEK to each intended node of the mobile ad hoc network. In an example embodiment, the new node-specific KEK is encrypted, prior to transmission, using the old node-specific KEK that is specific for the node to receive the new node-specific KEK. Thus if n nodes are to be sent a new node-specific KEK, the controller would encrypt the new node-specific KEK using n different old node-specific KEK's, each old node-specific KEK being associated with a respective node of the n nodes. In an example embodiment, the encrypted new node-specific KEK is incorporated into the payload portion of the message to be sent.

At step 94, a node receiving a message acknowledges receipt thereof. More specifically, when a node of the mobile ad hoc network receives the message, the recipient node uses its current (old) node-specific KEK to decrypt the appropriate portion of the message (e.g., the payload of the message packet). If the message decrypts correctly, the node acknowledges receipt of the message at step 94, to the controller. In an example embodiment, the acknowledgment message is encrypted with the new node specific KEK. Once the controller has received acknowledgements from all nodes it wishes to reach (intended nodes), the controller sends a second message to each intended node at step 96. The second message provides an indication to each node receiving the second message to start encrypting and decrypting messages using the new node-specific KEK. In an example embodiment, each second message is encrypted, prior to transmission, using a respective new node-specific KEK for each intended node.

At step 98, the nodes that received the second message and that acknowledged receipt of the second message start encrypting/decrypting messages using the new node-specific KEK and stop encrypting/decrypting messages using the old node-specific KEK. At step 100, each node that received and acknowledged receipt of a new node-specific KEK deletes its respective old node-specific KEK.

At this point, if a node is compromised, at most only messages encrypted in the current (or possibly future) KEK are at risk. Messages encrypted in old KEKs can not be decrypted. In particular, session keys encrypted in the old (pre-compromised) KEK can not be discovered and thus traffic encrypted in older session keys is not compromised.

Figure 8:
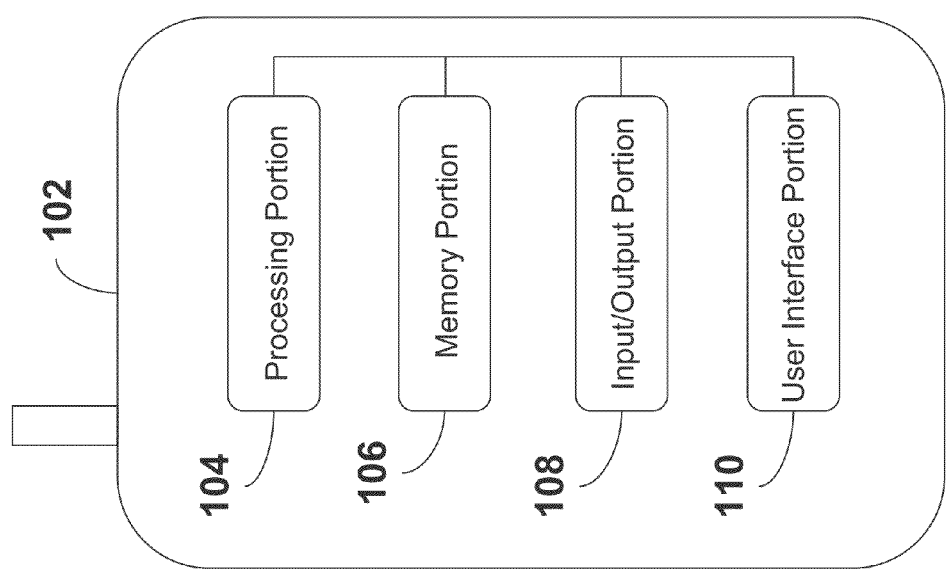
FIG. 8 is a block diagram of an example communications device 102 configured to communicate in a secure mobile ad hoc network.

FIG. 8 is a block diagram of an example communications device (also referred to as a node) 102 configured to communicate in a secure mobile ad hoc network. In an example configuration, communications device 102 is a mobile wireless device. The communications device 102 can comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a walkmans, etc.), a portable navigation device (e.g., GPS compatible device, A-GPS compatible device, etc.), or a combination thereof. The communications device 102 can include devices that are not typically thought of as portable, such as, for example, a public computing device, a navigation device installed in-vehicle, a set top box, or the like. The mobile communications device 102 can include non-conventional computing devices, such as, for example, a kitchen appliance, a motor vehicle control (e.g., steering wheel), etc., or the like. As evident from the herein description, a node, and thus a communications device, is not to be construed as software per se.

The communications device 102 can include any appropriate device, mechanism, software, and/or hardware for communicating in a secure mobile ad hoc network as described herein. In an example embodiment, the ability to communicate in a secure mobile ad hoc network is a feature of the communications device 102 that can be turned on and off. Thus, an owner of the communications device 102 can opt-in or opt-out of this capability.

In an example configuration, the communications device 102 comprises a processing portion 104, a memory portion 106, an input/output portion 108, and a user interface (UI) portion 110. It is emphasized that the block diagram depiction of communications device 102 is exemplary and not intended to imply a specific implementation and/or configuration. For example, in an example configuration, the communications device 102 comprises a cellular phone and the processing portion 104 and/or the memory portion 106 are implemented, in part or in total, on a subscriber identity module (SIM) of the mobile communications device 102. In another example configuration, the communications device 102 comprises a laptop computer. The laptop computer can include a SIM, and various portions of the processing portion 104 and/or the memory portion 106 can be implemented on the SIM, on the laptop other than the SIM, or any combination thereof.

The processing portion 104, memory portion 106, and input/output portion 108 are coupled together to allow communications therebetween. In various embodiments, the input/output portion 108 comprises a receiver of the communications device 102, a transmitter of the communications device 102, or a combination thereof. The input/output portion 108 is capable of receiving and/or providing information pertaining to communications in a secure mobile ad hoc network as described above. For example, the input/output portion 108 is capable of receiving and/or sending a message containing a cryptographic key, instruction pertaining to a cryptographic key, or the like, or any combination thereof, as described herein. In an example embodiment, the input/output portion 108 is capable of receiving and/or sending information to determine a location of the communications device 102. In an example configuration, the input\output portion 108 comprises a GPS receiver. In various configurations, the input/output portion 108 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 104 is capable of performing functions pertaining to communicating in a secure mobile ad hoc network as described above. For example, the processing portion 104 is capable of decrypting, encrypting, parsing a message, determining if decryption has occurred properly, accepting a message, incorporating a key into a message/packet, incorporating instructions pertaining to use of a key into a message/packet, generating an acknowledgment message, controlling use of a key, generating a key, deleting a key, any combination thereof, or the like, as described above. In various embodiments, the procession portion 104 is configured to determine a location of the communications device 102, a separate portion can be configured to determine location of the communication device 102, or any combination thereof.

In a basic configuration, the communications device 102 can include at least one memory portion 106. The memory portion 106 can store any information utilized in conjunction with communicating in a secure mobile ad hoc network as described above. For example, the memory portion 106 is capable of storing a key(s), information pertaining to decrypting, information pertaining to encrypting, information pertaining to parsing a message, information pertaining to determining if decryption has occurred properly, information pertaining to accepting a message, information pertaining to incorporating a key into a message/packet, information pertaining to incorporating instructions pertaining to use of a key into a message/packet, information pertaining to generating an acknowledgment message, information pertaining to controlling use of a key, information pertaining to generating a key, information pertaining to deleting a key information pertaining to location of a communications device, or a combination thereof, as described above. Depending upon the exact configuration and type of processor, the memory portion 106 can be volatile (such as some types of RAM), non-volatile (such as ROM, flash memory, etc.), or a combination thereof. The mobile communications device 102 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 102. As such, the memory portion 106 is not to be construed as software per se.

The communications device 102 also can contain a UI portion 110 allowing a user to communicate with the communications device 102. The UI portion 110 is capable of rendering any information utilized in conjunction with communicating in a secure mobile ad hoc network as described above. For example, the UI portion 110 can render a message, or the like, as described above. The UI portion 110 can provide the ability to control the communications device 102, via, for example, buttons, soft keys, voice actuated controls, a touch screen, movement of the mobile communications device 102, visual cues (e.g., moving a hand in front of a camera on the mobile communications device 102), or the like. The UI portion 110 can provide visual information (e.g., via a display), audio information (e.g., via speaker), mechanically (e.g., via a vibrating mechanism), or a combination thereof. In various configurations, the UI portion 110 can comprise a display, a touch screen, a keyboard, an accelerometer, a motion detector, a speaker, a microphone, a camera, a tilt sensor, or any combination thereof. The UI portion 110 can comprise means for inputting biometric information, such as, for example, fingerprint information, retinal information, voice information, and/or facial characteristic information.

Although not necessary to implement communications in a secure mobile ad hoc network, a communications device can be part of and/or in communications with various wireless communications networks. Some of which are described below.

Figure 9:
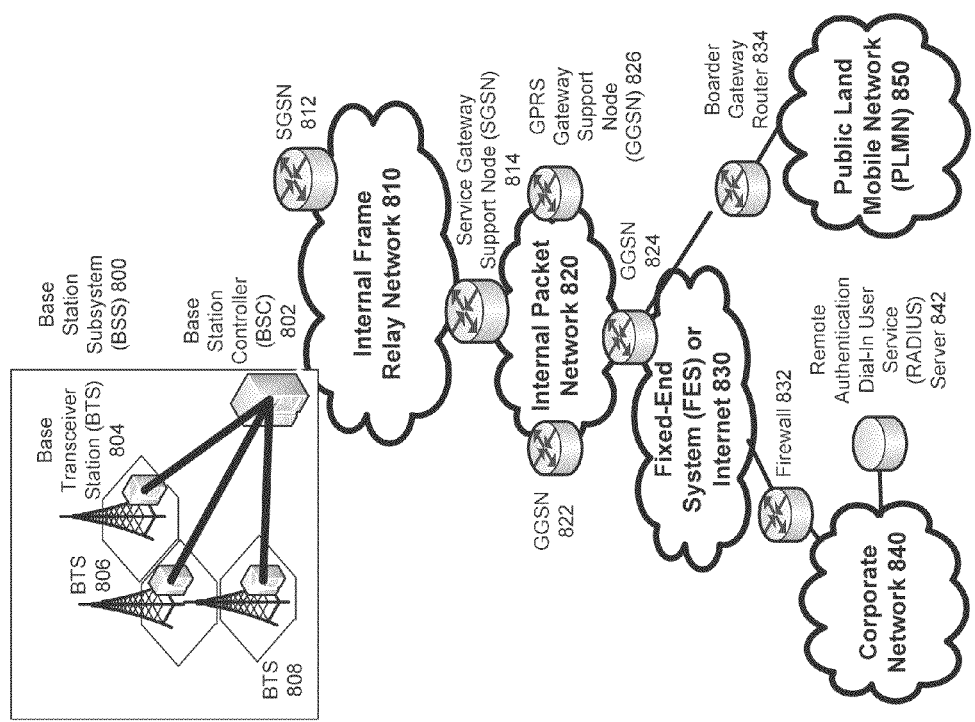
FIG. 9 depicts an overall block diagram of an exemplary packet-based mobile cellular network environment, such as a GPRS network, with which a secure mobile ad hoc network can communicate.

FIG. 9 depicts an overall block diagram of an exemplary packet-based mobile cellular network environment, such as a GPRS network, with which a secure mobile ad hoc network can communicate. In the exemplary packet-based mobile cellular network environment shown in FIG. 9, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In exemplary fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830.

As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 10:
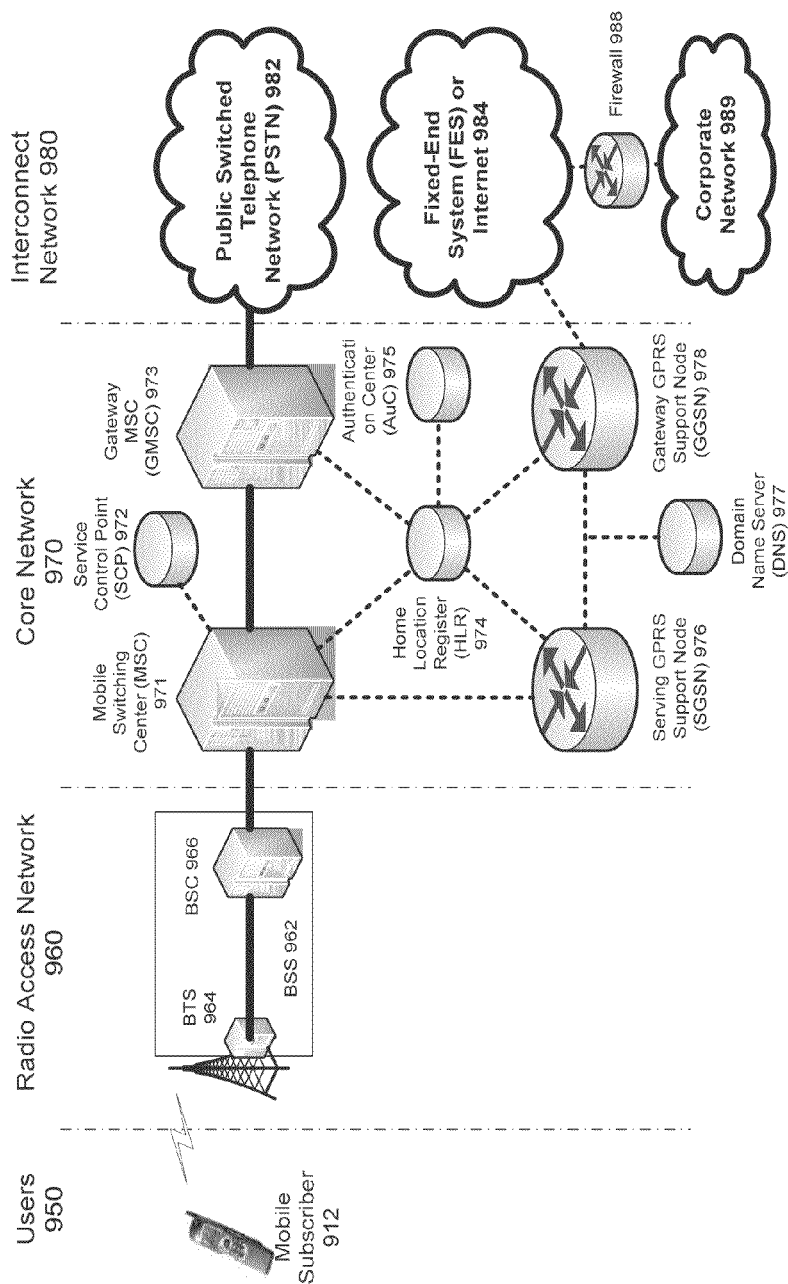
FIG. 10 illustrates an architecture of a typical GPRS network with which a secure mobile ad hoc network can communicate.

FIG. 10 illustrates an architecture of a typical GPRS network with which a secure mobile ad hoc network can communicate. The architecture depicted in FIG. 10 is segmented into four groups: users 950, radio access network 960, core network 970, and interconnect network 980. Users 950 comprise a plurality of end users. Note, device 912 is referred to as a mobile subscriber in the description of network shown in FIG. 10. In an example embodiment, the device depicted as mobile subscriber 912 comprises a communications device (e.g., communications device 78 12). Radio access network 960 comprises a plurality of base station subsystems such as BSSs 962, which include BTSs 964 and BSCs 966. Core network 970 comprises a host of various network elements. As illustrated in FIG. 10, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 10, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 10, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 11:
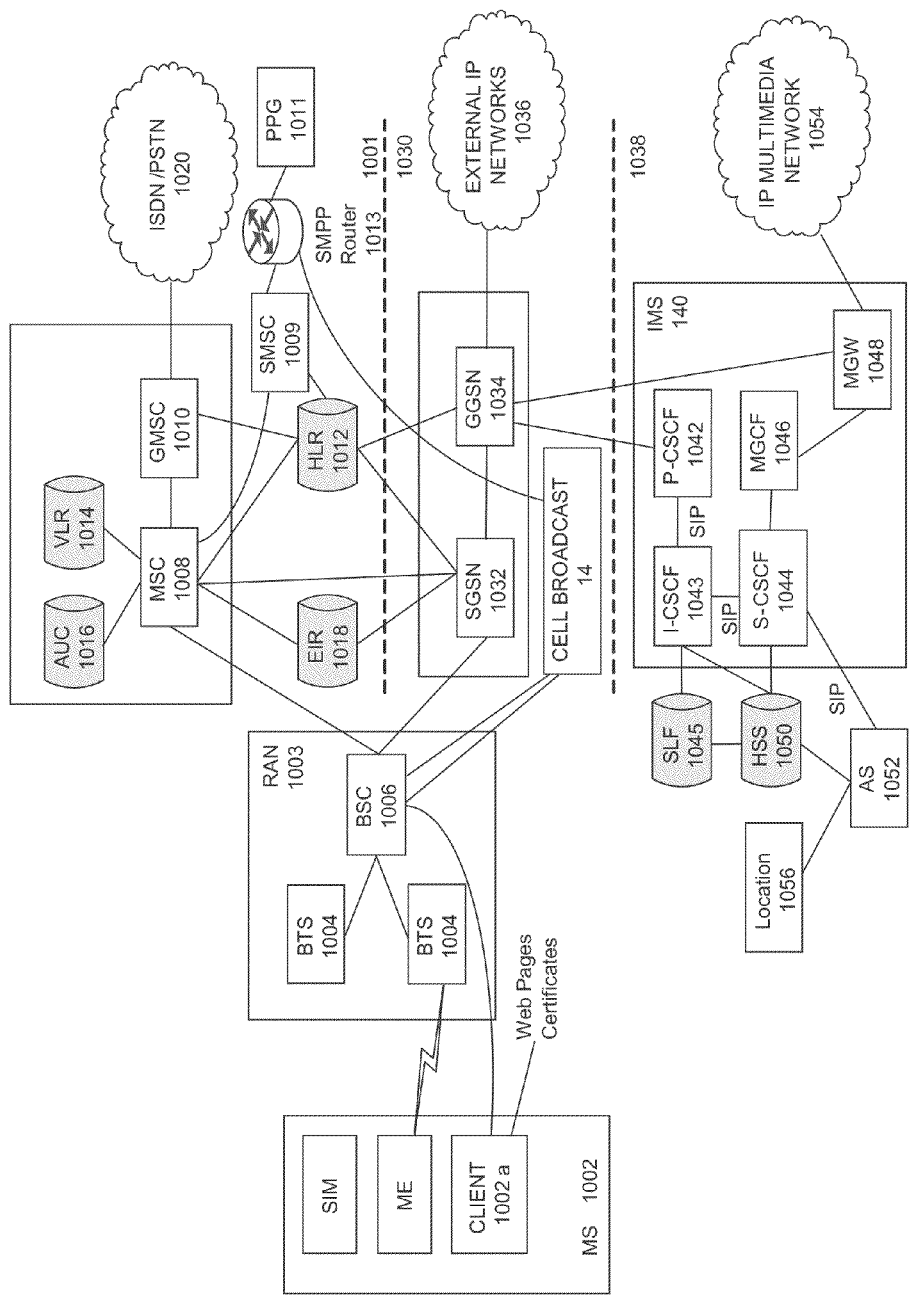
FIG. 11 illustrates an exemplary block diagram view of a GSM/GPRS/IP multimedia network architecture with which a secure mobile ad hoc network can communicate.

FIG. 11 illustrates an exemplary block diagram view of a GSM/GPRS/IP multimedia network architecture with which a secure mobile ad hoc network can communicate. As illustrated, the architecture of FIG. 11 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

A secure mobile ad hoc network as described herein can provide a defense to, and possibly prevent, various types of attacks. For example, a secure mobile ad hoc network can mitigate effects of eavesdropping. An unauthorized wireless node listening to the traffic but without the session key (or any KEK), can not decrypt the traffic. A secure mobile ad hoc network can mitigate effects of packet insertion. An unauthorized wireless node can transmit, but its packets will not decrypt correctly using the current session key, and thus the message will be discarded. A secure mobile ad hoc network can mitigate effects of a known compromised node. If a node is compromised, and it is known or suspected by the controller, the controller can use over-the-air re-keying to eliminate the node from the network without minimal perturbation to the rest of the mobile ad hoc network. Assuming the hardware of the node can be recovered, the node's software can be reloaded from scratch and a new KEK issued so it can rejoin the mobile ad hoc network.

While example embodiments of a secure mobile ad hoc network have been described in connection with various computing devices/processors, the underlying concepts can be applied to any computing device, processor, or system capable of implementing secure mobile ad hoc network. The various techniques described herein can be implemented in connection with hardware or software or, where appropriate, with a combination of both. Thus, the methods and apparatuses of a secure mobile ad hoc network can be implemented, or certain aspects or portions thereof, can take the form of program code (i.e., instructions) embodied in tangible storage media. Examples of tangible storage media include floppy diskettes, CD-ROMs, DVDs, hard drives, or any other tangible machine-readable storage medium (tangible computer-readable storage medium). When the program code is loaded into and executed by a machine, such as a computer, the machine becomes an apparatus for implementing a secure mobile ad hoc network. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations. As evident from the herein description, a tangible storage medium is to be construed to be statutory subject matter under United States Code, Title 35, Section 101 (35 U.S.C. §101).

The methods and apparatuses for a secure mobile ad hoc network also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing a secure mobile ad hoc network. When implemented on a general-purpose processor, the program code combines with the processor to provide a unique apparatus that operates to invoke the functionality of a secure mobile ad hoc network.

While a secure mobile ad hoc network has been described in connection with the various embodiments of the various figures, it is to be understood that other similar embodiments can be used or modifications and additions can be made to the described embodiments for a secure mobile ad hoc network without deviating therefrom. For example, one skilled in the art will recognize that providing security for a mobile ad hoc network as described in the present application may apply to any environment, whether wired or wireless, and may be applied to any number of such devices connected via a communications network and interacting across the network. Therefore, a secure mobile ad hoc network should not be limited to any single embodiment, but rather should be construed in breadth and scope in accordance with the appended claims.

What is claimed:

1. A method comprising:
   from a first node in a mobile ad hoc network comprising a first plurality of nodes, providing a first message comprising an encrypted shared key to each node of a second plurality of nodes, wherein:
      the second plurality of nodes is selected from the first plurality of nodes;
      each node of the second plurality of nodes has associated therewith a respective key encryption key (KEK); and
      each KEK is known only to the first node and a node to which the KEK is associated; and
      the encrypted shared key is encrypted with a KEK associated with a respective node of the second plurality of nodes to generate a respective plurality of encrypted shared keys;
   to each node of the second plurality of nodes from which acknowledgment of receipt of a respective first message is received, providing a second message comprising an indication to use the received shared key for communications within the mobile ad hoc network, wherein decryption of a message using a previous shared key is allowed; and
   to each node of the second plurality of nodes from which acknowledgment of receipt of a respective second message is received, providing a third message comprising an indication to not use a respective previous shared key for communications within the mobile ad hoc network.

2. The method of claim 1, further comprising, prior to providing a second message to an intended recipient node, encrypting the second message using a KEK associated with the intended recipient node.

3. The method of claim 1, wherein further comprising, prior to providing a third message to an intended recipient node, encrypting the third message using a KEK associated with the intended recipient node.

4. The method of claim 1, wherein an acknowledgment of receipt of a first message from an acknowledging node is encrypted using a KEK associated with the acknowledging node.

5. The method of claim 1, wherein an acknowledgment of receipt of a second message from an acknowledging node is encrypted using a KEK associated with the acknowledging node.

6. The method of claim 1, wherein the method is repeated periodically.

7. The method of claim 1, wherein the method is performed when triggered by an event.

8. The method of claim 1, wherein the trigger comprises an indication that a node of the plurality of nodes has been compromised.

9. The method of claim 1, wherein:
   each first message provided to each node of the second plurality of nodes is a geocast message comprising an indication of a respective location of a geographic region of intended reception of each first message;
   each second message provided to each node of the second plurality of nodes is a geocast message comprising an indication of a respective location of a geographic region of intended reception of each first message; and
   each third message provided to each node of the second plurality of nodes is a geocast message comprising an indication of a respective location of a geographic region of intended reception of each first message.

10. A device comprising:
a processor; and
memory coupled to the processor, the memory comprising executable instructions that when executed by the processor cause the processor to effectuate operations comprising:
generating a different key encryption key (KEK) for each of a plurality of nodes in a mobile ad hoc network, wherein each node of the plurality of nodes has associated therewith a current node-specific KEK;
encrypting each generated KEK, using a different current node-specific KEK;
providing a respective first message to each node of the plurality of nodes, wherein a respective first message comprises an encrypted KEK associated with a node to which a respective first message is being provided; and
to each node of the plurality of nodes from which acknowledgment of receipt of a respective first message is received, providing a second message comprising an indication to use the received KEK for communications within the mobile ad hoc network and to stop using a respective current node-specific KEK for communications within the mobile ad hoc network, wherein upon acknowledging receipt of a respective second message, a respective current node-specific KEK is deleted and replaced with the received KEK.

11. The device of claim 10, wherein the operations are repeated periodically.

12. The device of claim 10, wherein the operations are performed when triggered by an event.

13. The device of claim 12, wherein the trigger comprises an indication that a node of the plurality of nodes has been compromised.

14. A communications device comprising:
a processor; and
memory coupled to the processor, the memory comprising executable instructions that when executed by the processor effectuate operations comprising:
providing a first message comprising an encrypted shared key to each node of a plurality of nodes in a mobile ad hoc network, wherein:
each node of the plurality of nodes has associated therewith a respective key encryption key (KEK); and
each KEK is known only to the communications device and a node to which the KEK is associated; and
each encrypted shared key is encrypted with a KEK associated with a respective node;
receiving acknowledgment of receipt of a respective first message from a node of the plurality of nodes;
to each node of the plurality of nodes from which acknowledgment of receipt of a respective first message is received, providing a second message comprising an indication to use the received shared key for communications within the mobile ad hoc network, wherein decryption of a message using a previous shared key is allowed; and
to each node of the plurality of nodes from which acknowledgment of receipt of a respective second message is received, providing a third message comprising an indication to not use a respective previous shared key for communications within the mobile ad hoc network.

15. The communications device of claim 14, the operations further comprising, prior to a second message being provided to an intended recipient node, encrypting the second message using a KEK associated with the intended recipient node.

16. The communications device of claim 14, the operations further comprising, prior to a third message being provided to an intended recipient node, encrypting the third message using a KEK associated with the intended recipient node.

17. The communications device of claim 14, wherein an acknowledgment of receipt of a first message from an acknowledging node is encrypted using a KEK associated with the acknowledging node, the operations further comprising decrypting the acknowledgment of receipt.

18. The communications device of claim 14, wherein an acknowledgment of receipt of a second message from an acknowledging node is encrypted using a KEK associated with the acknowledging node, the operations further comprising decrypting the acknowledgment of receipt.

19. The communications device of claim 14, wherein:
each first message provided to each node of the plurality of nodes is a geocast message comprising an indication of a respective location of a geographic region of intended reception of each first message; and
each second message provided to each node of the plurality of nodes is a geocast message comprising an indication of a respective location of a geographic region of intended reception of each first message.

* * * * *